United States Patent
Zhang et al.

(10) Patent No.: US 10,403,238 B2
(45) Date of Patent: Sep. 3, 2019

(54) PRESENTATION OF REPRESENTATIONS OF INPUT WITH CONTOURS HAVING A WIDTH BASED ON THE SIZE OF THE INPUT

(71) Applicant: Lenovo (Singapore) Pte. Ltd., New Tech Park (SG)

(72) Inventors: Jianbang Zhang, Raleigh, NC (US); John Weldon Nicholson, Cary, NC (US); Scott Edwards Kelso, Cary, NC (US); Steven Richard Perrin, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 67 days.

(21) Appl. No.: 14/294,646

(22) Filed: Jun. 3, 2014

(65) Prior Publication Data
US 2015/0348510 A1 Dec. 3, 2015

(51) Int. Cl.
*G09G 5/26* (2006.01)
*G06F 3/0488* (2013.01)
*G06K 9/00* (2006.01)

(52) U.S. Cl.
CPC ............ *G09G 5/26* (2013.01); *G06F 3/04883* (2013.01); *G06K 9/00416* (2013.01); *G06F 2203/04807* (2013.01); *G09G 2340/04* (2013.01); *G09G 2354/00* (2013.01)

(58) Field of Classification Search
CPC ................................. G06K 15/02; G09G 5/26
USPC ......................................................... 345/472
See application file for complete search history.

(56) References Cited

U.S. PATENT DOCUMENTS

| 5,698,822 | A | | 12/1997 | Haneda et al. | |
|---|---|---|---|---|---|
| 5,864,636 | A | * | 1/1999 | Chisaka | G06K 9/00416 345/179 |
| 2003/0214490 | A1 | * | 11/2003 | Cool | G06F 3/03545 345/179 |
| 2005/0135678 | A1 | * | 6/2005 | Wecker | G06F 3/04883 382/186 |

(Continued)

FOREIGN PATENT DOCUMENTS

| CN | 1637686 A | 7/2005 |
|---|---|---|
| CN | 101110006 A | 1/2008 |

(Continued)

OTHER PUBLICATIONS

Jianbang Zhang, Song Wang, Bradley Park Stazisar, " Presentation of Representation of Handwriting Input on Display" related pending U.S. Appl. No. 14/601,522 filed Jan. 21, 2015.

(Continued)

*Primary Examiner* — Jin Ge
(74) *Attorney, Agent, or Firm* — John L. Rogitz; John M. Rogitz

(57) ABSTRACT

In one aspect, a device includes a touch-enabled display, a processor, and a memory accessible to the processor. The memory bears instructions executable by the processor to receive input to the touch-enabled display and present a representation of the input on the touch-enabled display. The representation is presented with the width of one or more contours of the representation being correlated to the size of at least a portion of the input to the touch-enabled display.

19 Claims, 7 Drawing Sheets

(56) References Cited

U.S. PATENT DOCUMENTS

| | | | | |
|---|---|---|---|---|
| 2005/0237311 | A1* | 10/2005 | Nakajima | G06F 3/04883 345/173 |
| 2008/0030425 | A1* | 2/2008 | Fullerton | G06F 3/1423 345/1.1 |
| 2008/0079757 | A1* | 4/2008 | Hochmuth | G09G 5/003 345/698 |
| 2009/0021530 | A1* | 1/2009 | Ishiguro | 345/619 |
| 2010/0231522 | A1* | 9/2010 | Li | 345/169 |
| 2011/0060627 | A1* | 3/2011 | Piersol et al. | 705/10 |
| 2012/0212440 | A1* | 8/2012 | Nishida et al. | 345/173 |
| 2012/0242571 | A1* | 9/2012 | Takamura | G09G 5/36 345/156 |
| 2012/0306766 | A1* | 12/2012 | Moore | G06F 3/04883 345/173 |
| 2013/0027614 | A1* | 1/2013 | Bayer | G06F 3/04842 348/563 |
| 2013/0136377 | A1* | 5/2013 | Luo et al. | 382/275 |
| 2013/0239046 | A1* | 9/2013 | Platzer | G06F 3/04845 715/784 |
| 2014/0068495 | A1* | 3/2014 | He et al. | 715/780 |
| 2014/0184542 | A1 | 7/2014 | Mao et al. | |
| 2015/0091947 | A1* | 4/2015 | Rakow | G09G 5/373 345/667 |
| 2015/0121207 | A1* | 4/2015 | Shuler | G05B 19/0423 715/256 |
| 2015/0169212 | A1* | 6/2015 | Chang | G06F 3/04883 715/780 |
| 2015/0346996 | A1* | 12/2015 | Ogawa | G06F 3/0233 715/863 |

FOREIGN PATENT DOCUMENTS

| | | |
|---|---|---|
| CN | 101539822 A | 9/2009 |
| EP | 2787450 A2 | 10/2014 |
| EP | 3048520 A1 | 7/2016 |

OTHER PUBLICATIONS

Anonymous, "Adobe Creative Cloud—Wikipedia, the free encyclopedia", (2015/0120), URL: https://en.wikipedia.org/w/index.php?title=Adobe_Creative_Cloud&oldid=643395717, (20160523), XP055274623 [A] 19 * the whole document *.

Jianbang Zhang, Song Wang, Bradley Park Strazisar, "Presentation of Representation of Handwriting Input on Display", related U.S. Appl. No. 14/601,522, Non-Final Office Action dated Aug. 10, 2017.

Jianbang Zhang, Song Wang, Bradley Park Strazisar, "Presentation of Representation of Handwriting Input on Display", related U.S. Appl. No. 14/601,522, Applicant's response to Non-Final Office Action filed Nov. 6, 2017.

Jianbang Zhang, Song Wang, Bradley Park Strazisar, "Presentation of Representation of Handwriting Input on Display", related U.S. Appl. No. 14/601,522, Final Office Action dated Feb. 26, 2018.

Jianbang Zhang, Song Wang, Bradley Park Strazisar, "Presentation of Representation of Handwriting Input on Display", related U.S. Appl. No. 14/601,522, Non-Final Office Action dated May 29, 2018.

Jianbang Zhang, Song Wang, Bradley Park Strazisar, "Presentation of Representation of Handwriting Input on Display", related U.S. Appl. No. 14/601,522, Applicant's response to Non-Final Office Action filed Aug. 9, 2018.

Jianbang Zhang, Song Wang, Bradley Park Strazisar, "Presentation of Representation of Handwriting Input on Display", related U.S. Appl. No. 14/601,522, Non-Final Office Action dated Dec. 14, 2018.

Jianbang Zhang, Song Wang, Bradley Park Strazisar, "Presentation of Representation of Handwriting Input on Display", related U.S. Appl. No. 14/601,522, Applicant's response to Final Office Action filed May 14, 2019.

* cited by examiner

| Height | Scale Factor (pen) | Scale Factor (finger) |
|---|---|---|
| 3.81 cm | 0.2 | 0.3 |
| 2.54 cm | 0.1 | 0.122 |
| 1.27 cm | 0.08 | 0.09 |

PRESENTATION OF REPRESENTATIONS OF INPUT WITH CONTOURS HAVING A WIDTH BASED ON THE SIZE OF THE INPUT

FIELD

The present application relates generally to presenting representations of input on a display with contours that have a width based on the size of the input.

BACKGROUND

It is often desirable to have representations of e.g. handwriting input from a user presented on a display. However, there currently are no adequate and relatively inexpensive ways to easily and quickly establish and/or adjust the stroke width of such representations.

SUMMARY

Accordingly, in one aspect a device includes a touch-enabled display, a processor, and a memory accessible to the processor. The memory bears instructions executable by the processor to receive input to the touch-enabled display and present a representation of the input on the touch-enabled display. The representation is presented with the width of one or more contours of the representation being correlated to the size of at least a portion of the input to the touch-enabled display.

In another aspect, a method includes receiving input to an input device, where the input pertains to plural characters selected from the group consisting of numerical characters, alphabetical characters, and symbol characters. The method also includes presenting respective representations on a display of each of the characters, where the width of the contours of each respective representation is based on the size of at least a portion of the input for the respective character to which the respective representation pertains.

In still another aspect, an apparatus includes a first processor, a network adapter, and storage bearing instructions executable by a second processor for receiving input at an input device, determining that the input pertains to at least one character selected from the group consisting of alphabetical characters, numerical characters, and symbol characters, and presenting a representation of the at least one character on a display. The representation is presented with the width of lines and curves of the representation being based on the size of at least a portion of the input to the input device. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
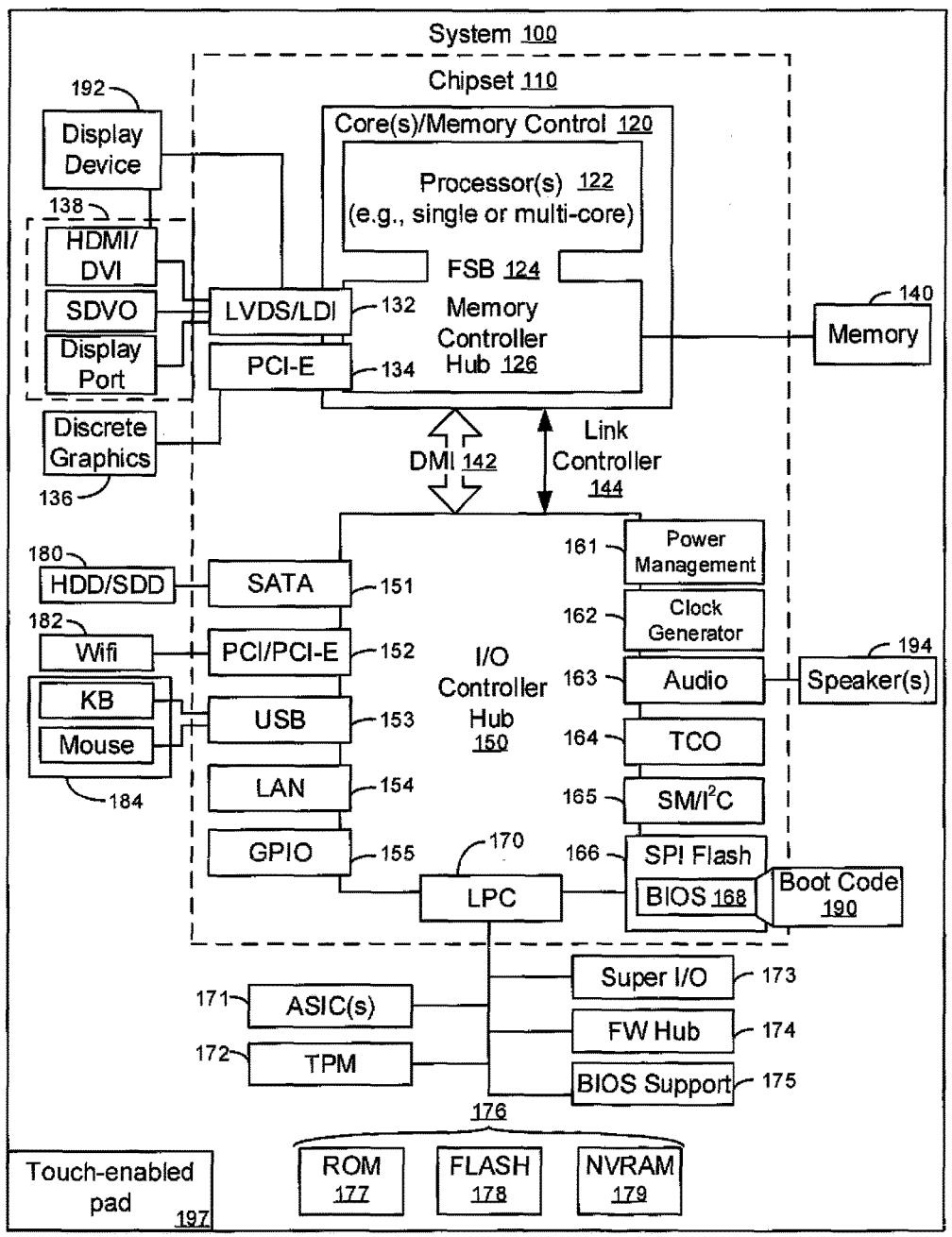
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM)

179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 189 in communication with the processor 122 and providing input thereto based on e.g. a user providing audible input to the microphone 189. A camera 191 is also shown, which is in communication with and provides input to the processor 122. The camera 191 may be, e.g., a thermal imaging camera, a digital camera such as a webcam, and/or a camera integrated into the system 100 and controllable by the processor 122 to gather pictures/images and/or video. In addition, the system 100 may include a GPS transceiver 193 that is configured to e.g. receive geographic position information from at least one satellite and provide the information to the processor 122. However, it is to be understood that another suitable position receiver other than a GPS receiver may be used in accordance with present principles to e.g. determine the location of the system 100.

Additionally, the system 100 may include a gyroscope 195 for e.g. sensing and/or measuring the orientation of the system 100, and an accelerometer 196 for e.g. sensing acceleration and/or movement of the system 100. Even further, the system 100 may include a touch controller and/or touch-capturing component with may be used to receiving touch input, such as e.g. the touch-enabled pad 197 shown that is understood to be configured to receive input from a user (e.g. based on a user touching the touch-enabled pad 197 with their finger and/or otherwise manipulating the touch-enabled pad 197). The touch-enabled pad 197 is also configured to receive input from another device such as e.g. a (e.g. electronic and/or stylus) pen that itself is configured to provide input to the pad 197 (e.g. via a pen stylus tip) at least when in contact therewith and/or as manipulated by a user.

Figure 2:
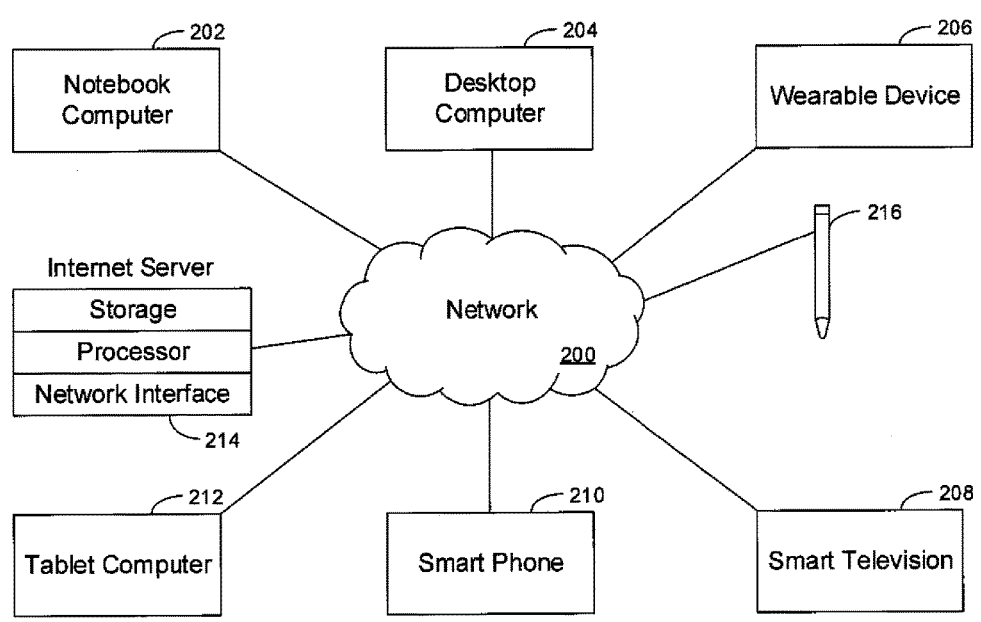
FIG. 2 is a block diagram of a network of devices in accordance with present principles.

Before moving on to FIG. 2, it is to be understood that an example client device or other machine/computer may include fewer or more features than shown on the system 100 of FIG. 1. For instance, e.g., the system 100 may include one or more additional components to receive and/or provide input via different methods and/or of different types in accordance with present principles, such as e.g. the system 100 including or otherwise being associated with an active pen/stylus. Furthermore, note that e.g. for handwriting and/or drawing input to the system 100, the input may be provided remotely such as through Bluetooth signal and ultrasonic signal from another device. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, an input device 216, and a server 214 in accordance with present principles such as e.g. an Internet server that may e.g. provide cloud storage accessible to the devices 202-212 and 216. It is to be understood that the devices 202-216 are configured to communicate with each other over the network 200 to undertake present principles.

Describing the input device 216 in more detail, it may be a pen such as e.g. an electronic pen and/or stylus pen. Furthermore, note that the device 216 is configured to provide input to one or more of the devices 202-214, including e.g. providing input to touch-enabled pads and touch-enabled displays on the devices 202-214 in accordance with present principles e.g. when in physical contact therewith and/or based on manipulation of the device 216 against another of the devices 202-214 by a user.

Figure 3:
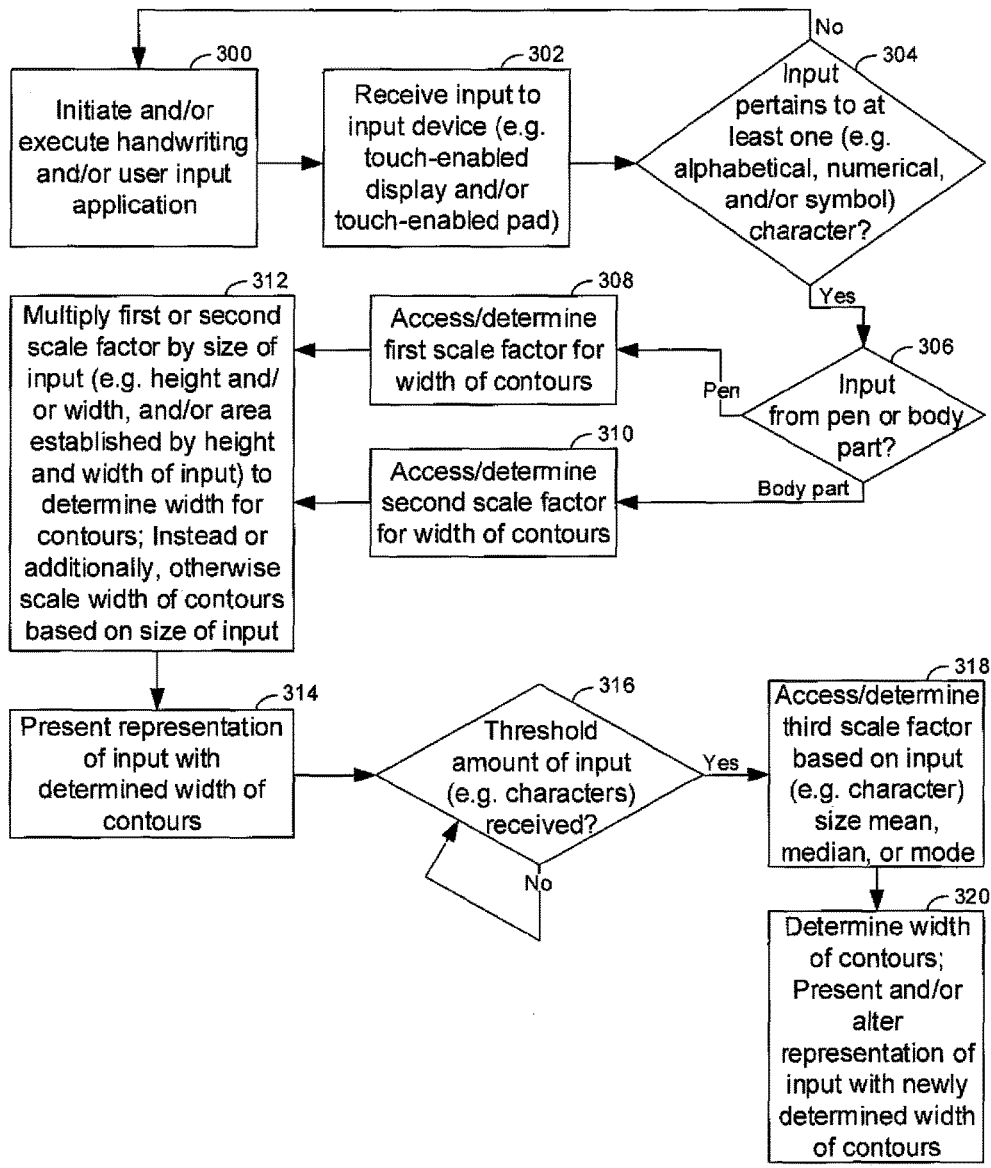
FIG. 3 is a flow chart showing an example algorithm in accordance with present principles.

Referring to FIG. 3, it shows example logic that may be undertaken by a device such as the system 100 in accordance with present principles. Beginning at block 300, the logic initiates and/or executes an application for undertaking present principles, such as e.g. a handwriting application and/or a user input application. The logic then proceeds to block 302, where the logic receives input to an input device (e.g. a touch-enabled pad and/or a touch-enabled display) on a device undertaking the logic of FIG. 3 (referred to below as the "present device"). In response to the input received at block 302, the logic proceeds to decision diamond 304.

At diamond 304, the logic determines whether the input pertains to and/or includes at least one character such as e.g. an alphabetical character (e.g. in the English alphabet, a letter from A to Z), a numerical character (e.g., in Arabic numerals, a number from zero to nine), and/or symbols and/or symbol characters (e.g., a dollar sign ($), a percentage symbol (%), a parenthesis symbol ((and/or)), a pound sign (#), etc.). Note that the input may also be determined to pertain to still other characters such as e.g. Chinese and Japanese language characters. Also, note that the determination based on the input at diamond 304 may be made using handwriting and/or character recognition principles and/or software. In any case, a negative determination at diamond 304 causes the logic to revert back to block 300 and proceeds therefrom (e.g. continue to executing the application until additional input is received).

However, an affirmative determination at diamond 304 causes the logic to proceed to decision diamond 306, at which the logic determines whether the input received at block 302 was input to the input device from a pen (e.g. electronic and/or stylus pen) or from contact of the input device with a person's body part (e.g., fingertip, knuckle, another portion of the hand, etc.).

A determination at diamond 306 that the input was from a pen causes the logic to proceed to block 308, where the logic accesses and/or determines a first scale factor to use to determine a width of contours (e.g. width of lines and curves) for which to present one or more representations of the input (and/or the characters specifically) on a display of the present device.

However, a determination at diamond 306 that the input was from a body part causes the logic to proceed to block 310 rather than block 308. At block 310, the logic accesses and/or determines a second scale factor (which may be different from the first scale factor) to use to determine a width of contours (e.g. width of lines and curves) for which to present one or more representations of the input (and/or the characters specifically) on a display of the present device.

Note that one or both of the first and second scale factors may be accessed and/or determined based on e.g. accessing a default (e.g., user-defined default) scale factor stored on (e.g. in a data table such as the one to be described below in reference to FIG. 7) and/or set at the present device for use to determine a contour width corresponding to particular pen input or body part input, and/or determining a constant which the present device is to use as the default based on e.g. touch-enabled display dimensions, application settings, etc.

Regardless, it may be appreciated from FIG. 3 that whether the logic proceeds from block 308 or block 310, in either case it proceeds to block 312. At block 312, the logic determines a width of contours to use when presenting one or more representations of the input by multiplying the first or second scale factor (e.g. depending on whether the logic arrived at block 312 from block 308 (thus using the first scale factor) or from block 310 (thus using the second scale factor)) by a size of the input to the touch-enabled input device to thus determine a width for the contours. In addition to or in lieu of the foregoing, but also at block 312, the logic may scale the width of the contours based on the size of the input and/or other factors such as e.g. the pressure at which the input was applied (e.g., the greater the pressure, the wider the width). In any case, not that the size of the input as described immediately above may include the height and/or width of the input, and/or an area of the input established and/or defined based on the height and width of the input.

Still in reference to FIG. 3, after block 312 the logic proceeds to block 314. At block 314, the logic presents on a display of the present device a representation of the input with the width of the contours of the representation being presented at the width determined at block 312. E.g., if input included characters provided in sequence establishing the word "hello," each of the letters of the word "hello" as represented on the display would have contours and/or outlines of each of the letters h, e, l, l, and o presented at the determined width. The foregoing may also be applied to phrases and/or sentences in addition to mere words such as "hello," and accordingly in such embodiments e.g. a sentence may be presented with multiple segments thereof (e.g. subject and predicate) presented with the (e.g. same) determined contour and/or stroke width.

After presenting the representation(s) at block 314, the logic proceeds to decision diamond 316. At diamond 316 the logic determines whether a threshold amount of input (e.g. threshold amount of characters) has been received. The threshold may be preset and/or may be set by a user. In any case, a negative determination causes the logic to continue making the determination at diamond 316 until such time as an affirmative determination is made. Then, responsive to an affirmative determination at diamond 316, the logic proceeds to block 318.

At block 318 and responsive to the threshold amount of input being received, the logic accesses or determines a third scale factor (which may be different from the first and/or second scale factor, or may be the same as the first and/or second scale factor) based on the size of at least the threshold amount of input (e.g. threshold amount of characters) that has been received. E.g., the size of the threshold amount of input (e.g. total input received to that point) that is used to determine the scale factor may be the mean, median, or mode of the height, width, and/or area of the characters in the threshold amount of input.

From block 318 the logic proceeds to block 320, where the logic determines the width of contours for which to present representations of the threshold amount of input based on the third scale factor in accordance with present principles (e.g., by multiplying the third scale factor by the mean, median, or mode of at least one of the height, width, and area of the characters of the input), and then presents a representation of the input (e.g. including at least the threshold amount) and/or alters the previously presented representation of the input (e.g. including at least the threshold amount) by presenting the representation using the width of contours just determined (at block 320) for each respective character in the representation.

Figure 4:
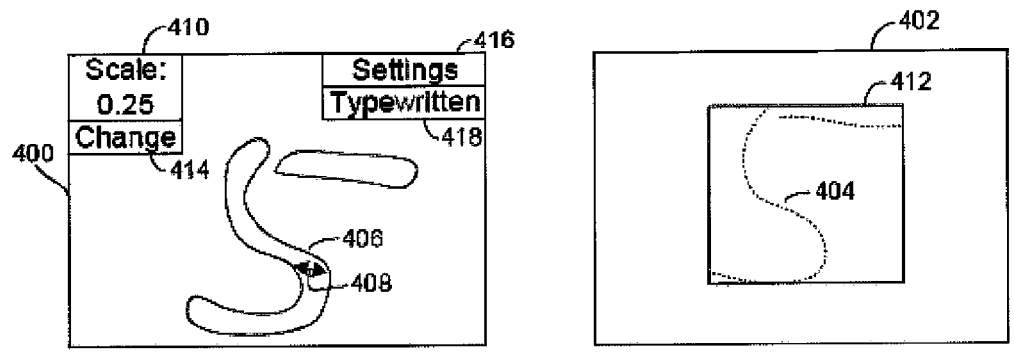
FIGS. 4-6 are example illustrations in accordance with present principles.

Now in reference to FIG. 4, it is an example illustration in accordance with present principles. FIG. 4 includes an example user interface (UI) 400 presentable on a display of a device such as the system 100 described above, as well as an example of an input device 402 such as e.g. a touch-enabled display or touch-enabled pad which may also be on a device such as the system 100. It is to be understood that the perforated tracing shown on the input device 402 represents input 404 which was directed to the device 402 by a user e.g. using a pen and/or finger. It may be appreciated based on the input 404 that in the example shown it pertains to a specific character, the number five, a representation 406 of which is presented on the UI 400. Note that while the representation 406 is (e.g. generally) in the same shape and/or height/width proportions as the corresponding input 404 itself (e.g. even if in some instances not presented at the same height and width as the input 404 itself) and/or may be a tracing of the input 404 itself, it has contours of a (e.g. constant and/or uniform) width 408 that may be different from, and in the present instance wider than, the actual width of the input 404. Also note that in the example shown, the UI 400 includes an indication 410 of the scale (e.g. a scale factor number) used to compute and/or otherwise determine the width 408.

Additionally, as noted above, it is to be understood that the area of input to an input device may be used to determine the contour width 408 e.g. by taking the area and multiplying it by a scale factor. As shown on the input device 402, the box 412 is understood to represent such an area, which is defined and/or established based on the height and width of the input 404 e.g. such that the boundaries of the rectangular area are based on and/or correspond to the height and width of the input 404.

Still in reference to FIG. 4 and describing the UI 400 further, note that below the indication 410 is a selector element 414 that is selectable to change the scale shown in the indication 410, e.g. directly at the indication 410 by presenting a cursor thereat to delete the indicated scale and input a new and/or different scale to use for determining the width of the contours of the representation 406, and/or by presenting another UI such as the one to be described below in reference to FIG. 8 for changing the scale. However, regardless of whether the scale is changed by changing it at the UI 400 or at another UI such as the UI of FIG. 8, in some embodiments once changed the new scale may be automatically without further user input established as a default scale for future input of the same size, and/or may be used to automatically without further user input adjust other defaults for input of different sizes based on the new scale so that they are in conformance with user preference (e.g. proportional based on the new scale that was set).

Additionally, the UI 400 includes a settings selector element 416 that is selectable to automatically without further user input cause the device presenting the UI 400 to present a settings UI for e.g. configuring settings associated with the application being used to receive input to the device 402 and/or present the representation 406, such as the settings UI to be described below in reference to FIG. 9. Note that still another selector element 418 is shown which is selectable to automatically without further user input change the representation from being presented as a tracing of the (e.g. actual) input 404 and/or handwriting corresponding to the (e.g. actual) input 404 to a representation of a character provided in the input in typewritten and/or typographic form e.g. based on identification by the device presenting the UT 400 of the input as the character, in this case the number five.

Figure 5:
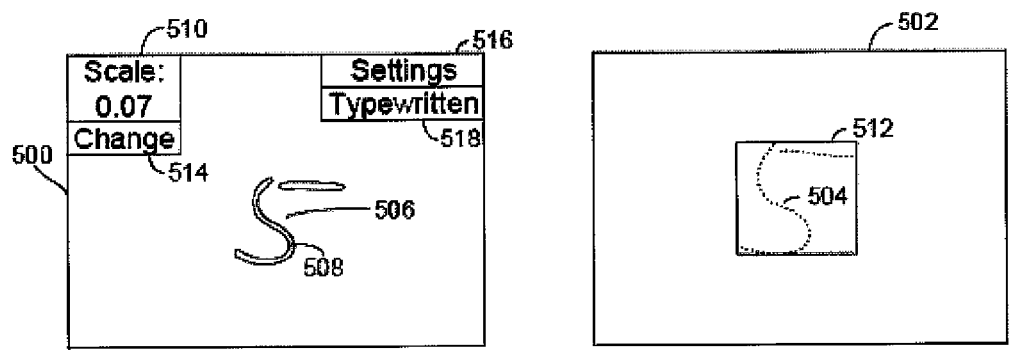

Continuing the detailed description in reference to FIG. 5, it shows another example illustration in accordance with present principles. FIG. 5 includes an example user interface (UI) 500 presentable on a display of a device such as the system 100 described above, as well as an example of an input device 502 such as e.g. a touch-enabled display or touch-enabled pad which may also be on a device such as the system 100. It is to be understood that the perforated tracing shown on the input device 502 represents input 504 which was directed to the device 502 by a user e.g. using a pen and/or finger. It may be appreciated based on the input 504 that in the example shown it pertains to a specific character, the number five, a representation 506 of which is presented on the UI 500. Note that while the representation 506 is (e.g. generally) in the same shape and/or height/width proportions as the corresponding input 504 itself (e.g. even if in some instances not presented at the same height and width as the input 504 itself) and/or may be a tracing of the input 504 itself, it has contours of a (e.g. constant and/or uniform) width 508 that may be different from, and in the present instance wider than, the actual width of the input 504. In contrast to FIG. 4, the width 508 is also less than the width 408 based on the input 504 being smaller in at least one dimension (e.g. height or width) than the input 404. However, the width 508 may still be determined in accordance with present principles by e.g. multiplying a scale factor by a metric for the input 504 (e.g. height, width, and/or area).

The UI 500 also includes an indication 510 pertaining to the scale factor being used, which may be substantially similar in function and configuration to the indication 410. Furthermore, the UI 500 includes a box 512 representing an area defined by and/or established the same way as the area of FIG. 4 represented by the box 412 (e.g. based on the height and width of the input 504), and selector elements 514, 516, and 518 respectively similar in function and configuration to the selector elements 414, 416, and 418 described above.

Figure 6:
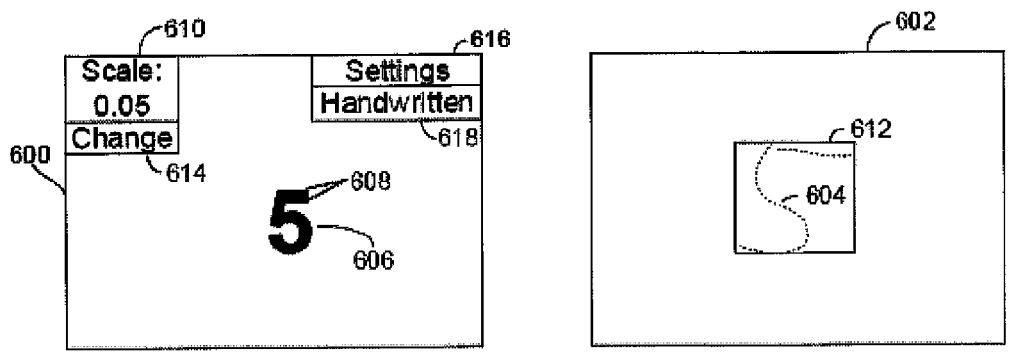

Now in reference to FIG. 6, it shows another example illustration in accordance with present principles. FIG. 6 includes an example user interface (UI) 600 presentable on a display of a device such as the system 100 described above, as well as an example of an input device 602 such as e.g. a touch-enabled display or touch-enabled pad which may also be on a device such as the system 100. It is to be understood that the perforated tracing shown on the input device 602 represents input 604 which was directed to the device 602 by a user e.g. using a pen and/or finger. It may be appreciated based on the input 604 that in the example shown it pertains to a specific character, the number five, a representation 606 of which is presented on the UI 600. However, in contrast to FIGS. 4 and 5, note that the representation 606 is a typographic representation of the number five rather than a tracing of the input 604. Nonetheless, in some embodiments the representation 606 may be presented at the same (e.g. total) height and width as the corresponding input 604 itself, but in any case has contours of a (e.g. constant and/or uniform) width 608 that may be different from, and in the present instance wider than, the actual width of the input 604. Also note that the width 608 may be determined in accordance with present principles by e.g. multiplying a scale factor by a metric for the input 604 (e.g. height, width, and/or area).

Still in reference to FIG. 6, the UI 600 also includes an indication 610 pertaining to the scale factor being used, which may be substantially similar in function and configuration to the indication 410. Furthermore, the UI 600 includes a box 612 representing an area defined by and/or established the same way as the area of FIG. 4 represented by the box 412 (e.g. based on the height and width of the input 604), and selector elements 614 and 616 respectively similar in function and configuration to the selector elements 414 and 416 described above. Additionally, a selector element 618 is shown, which is selectable to automatically without further user input change the representation 606 from being presented as a typographic representation of a character in the input 604 as shown to being e.g. a tracing of the (e.g. actual) input 604 (and/or even an identified character in the input 604 specifically) and/or handwriting corresponding to the (e.g. actual) input 604 e.g. such as is shown in FIGS. 4 and 5.

Figures 7, 8:
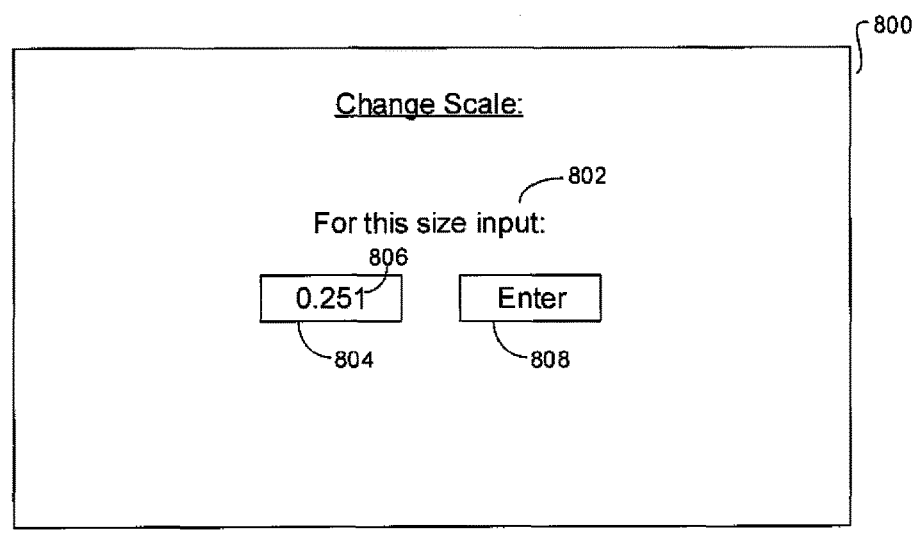
FIG. 7 is an example data table in accordance with present principles.
FIGS. 8 and 9 are example user interfaces (UIs) in accordance with present principles.

Moving on in the detailed description with reference to FIG. 7, it shows an example data table 700 that may be used by a device such as the system 100 to determine a scale factor that may be used in accordance with present principles (e.g. at blocks 308 and 310 of the logic of FIG. 3). Thus, the table 700 includes a first column 702 pertaining to one or more metrics of input to an input device in accordance with present principles such as e.g. height, width, weight, pressure, and/or area of the input, and specifically in the present instance the first column 702 pertains to height. The column 702 in the example shown lists plural entries for various heights of input.

Furthermore, second column 704 and third column 706 provide scale factors for input from a pen and finger, respectively, that are associated with each height entry from column 702. Thus, a processor of a device undertaking present principles may receive input at an input device thereon, determine whether the input is from a pen or a user's body part, determine the height of the input, and then access the data table 700 to locate the entry in column 702 corresponding to and/or matching the determined height, and then based on whether the input was from a pen or user determine which scale factor in that row, either at column 704 or 706, is to be used for determining contour width as set forth herein.

Before moving on to FIG. 8, note that while the metric in the first column 702 is for a specific height, various size entries (e.g. for height, width, and/or area) indicated in data tables to be used in accordance with present principles and associated with one or more scale factors may be for size ranges rather than for specific sizes. Thus, e.g., taking as example the first row beneath the headers in the data table 700 indicating a scale factor of 0.2 for pen input and of 0.3 for finger input, those scale factors rather than being associated with a height of 3.81 centimeters may instead be associated with a height range indicated in the first column 702, such as e.g. 3.70 centimeters to 3.90 centimeters. Other entries may also be included for height ranges above and/or below that range, and hence upon determining a height of input to the device, the device may access such a data table with height ranges to determine which range the determined height falls within, and hence determine a scale factor for use for presenting a representation of the input at a particular contour width. The same range principles apply to data tables also or instead correlating input width and/or area with scale factors, mutatis mutandis.

Now in reference to FIG. 8, it shows an example user interface (UI) 800 for changing a scale for the width of contours of a representation of input in accordance with present principles. It is to be understood that e.g. the UI 800 may be presented responsive to selection of the selector elements 414, 514, and/or 614. In any case, the UI 800 includes an indication 802 indicating e.g. that what is shown is the currently set scale and/or scale factor for a particular size input provided to the device presenting the UI 800 by a user. The UI 800 also includes an input box 804 indicating the currently set scale and/or scale factor, along with a cursor 806 for e.g. deleting the currently set scale and/or scale factor presented in the box 804 and inputting a new and/or different scale and/or scale factor thereto, which may be set automatically without further user input responsive to input of a number to the box 804 (e.g. using a keyboard) and/or may be set responsive to input of the new and/or different scale and/or scale factor and then selection of the enter selector 808.

Figure 9:
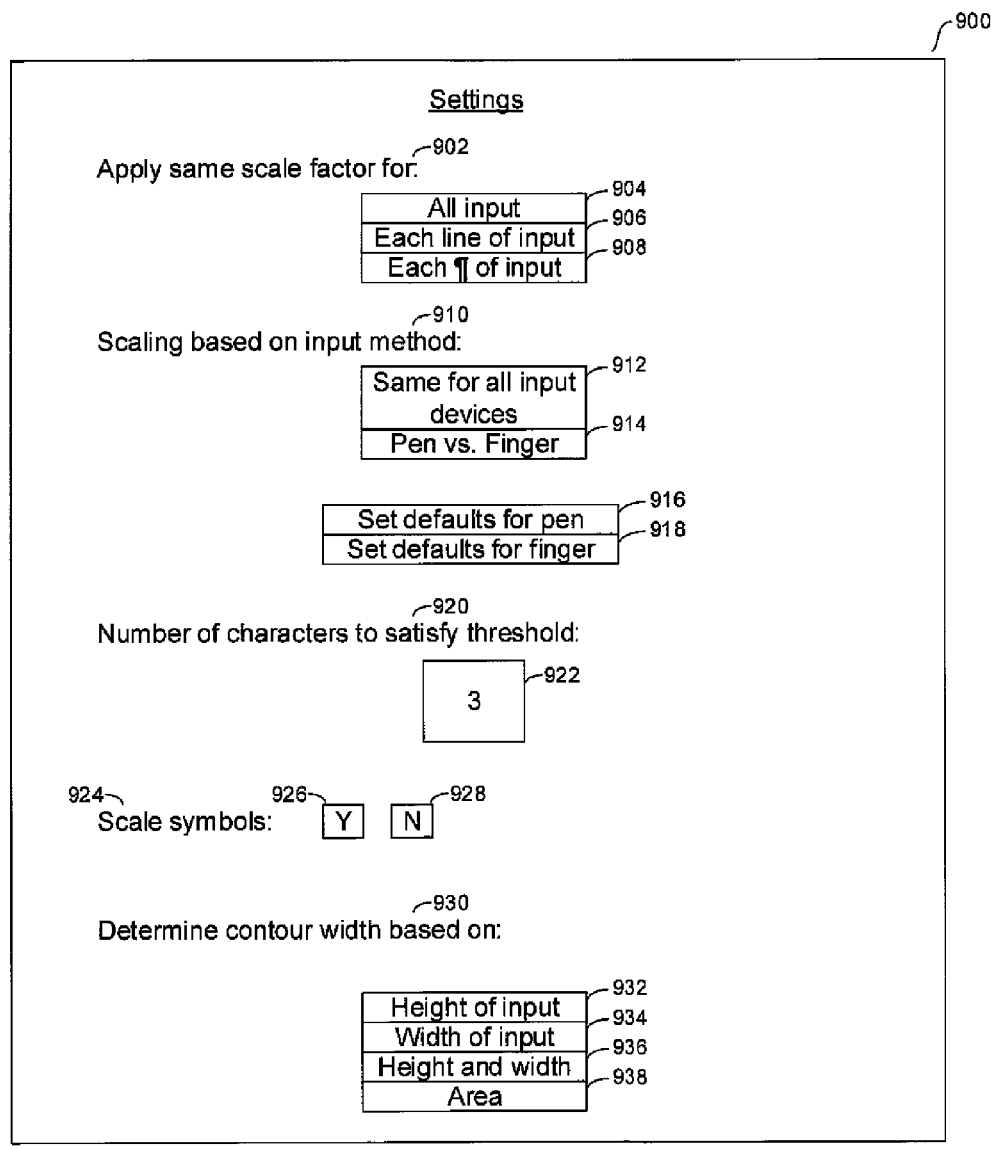

Now in reference to FIG. 9, it shows an example settings UI 900 for configuring settings associated with an application or other software for undertaking present principles. The UI 900 includes a first setting 902 pertaining to input for which to apply a particular scale factor and/or contour width once determined (e.g. based on input method (e.g. finger or pen), based on a default scale factor for input of a certain size, and/or based on a scale factor determined based on the mean size of input as described above, etc.). Thus, a selector element 904 is shown that is selectable to automatically without further user input configure the device to apply the same scale factor for all input to the device, such as e.g. for a particular input sequence and/or session (e.g. application session). A selector element 906 is also shown that is selectable to automatically without further user input configure the device to apply the same scale factor to all input of a given line of input (the line being established and/or based on a line of input to the input device, and/or based on a line of representations as presented on a display (e.g. as a virtual piece of paper presenting representations of handwriting input to the input device)). A third selector element 908 is shown that is selectable to automatically without further user input configure the device to apply the same scale factor to all input of a given paragraph of input (the paragraph being established and/or based on a paragraph of input to the input device, and/or based on a paragraph of representations as presented on a display (e.g. as a virtual piece of paper presenting representations of handwriting input to the input device)). However, further note that in some embodiments, and in such embodiments a corresponding selector element may be presented for the setting 902, a scale factor may be determined for each respective character (e.g. a per-character basis) rather than applying the same scale factor to an entire line, paragraph, or session of input.

The UI 900 also includes a second setting 910 for configuring the device to scale the width of contours of representations of input based on input method, if desired. Thus, a selector element 912 is shown that is selectable to automatically without further user input configure the device to use the same scale factor based on size of input regardless of input device and/or method (e.g. regardless of whether the input is from a pen or user's body). A selector element 914 is also shown that is selectable to automatically without further user input configure the device to use different scale factors based on size of input as described herein e.g. based on whether the input is from a pen or a user's body.

Furthermore, note that the second setting 910 includes a selector element 916 that is selectable to automatically without further user input responsive thereto e.g. cause another UI to be presented for configuring one or more scale factor defaults for pen input. Also, a selector element 918 is shown that is selectable to automatically without further user input responsive thereto e.g. cause another UI to be presented for configuring one or more scale factor defaults for body part (e.g. finger) input.

Still in reference to FIG. 9, a third setting 920 is shown for configuring a threshold amount of input (e.g. a threshold number of characters specifically) that are to be received (e.g. as determined at block 316 discussed above) for a device undertaking present principles to then determine a scale factor for use based on e.g. the mean size of the characters. In any case, an input box 922 is shown, and is presenting the currently configured threshold which in the present instance is three. Note that selection of the box 922 is understood to allow for deletion of the number and/or input of another threshold amount and/or number (e.g. using a keyboard) to thus automatically without further user input configure the device according to the new threshold.

FIG. 9 also shows a fourth setting 924 presented on the UI 900, which pertains to whether to scale contours of representations of symbol input and/or characters (e.g. by using a scale factor) in accordance with present principles. Thus, a yes selector element 926 is shown that is selectable to automatically without further user input configure the device to scale contours of representations of symbol input and/or characters, while a no selector element 928 is also shown that is selectable to automatically without further user input configure the device to decline to scale contours of representations of symbol input and/or characters.

The UI 900 also includes still another setting 930 for which input size parameter and/or metric the device is to use for determining (e.g. using a scale factor as set forth herein) contour width for a representation of input. Thus, a first selector element 932 is shown that is selectable to automatically without further user input responsive thereto configure the device to use input height as the input size parameter and/or metric to use, a second selector element 934 is shown that is selectable to automatically without further user input responsive thereto configure the device to use input width as the input size parameter and/or metric to use, a third selector element 936 is shown that is selectable to automatically without further user input responsive thereto configure the device to use both input height and input width as the input size parameter and/or metric to use, and a fourth selector element 938 is shown that is selectable to automatically without further user input responsive thereto configure the device to use input area as the input size parameter and/or metric to use.

Note that using both input height and width is may not necessarily involve the same process, determinations, and/or computations as using input area. E.g., input height and width may be added together to render a first number, and then that first number may be multiplied by a scale factor to determine a contour width.

Figure 10:
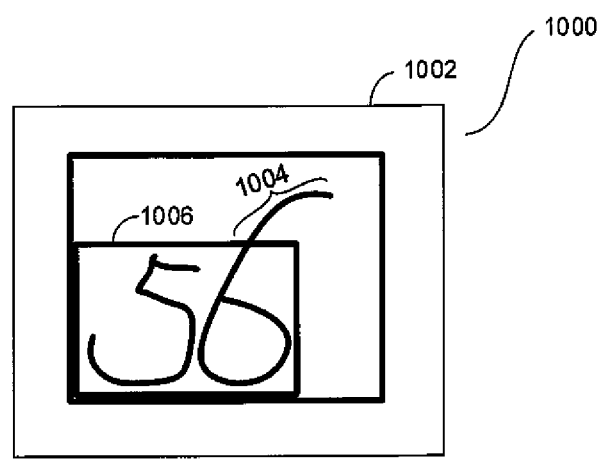
FIG. 10 is an example illustration in accordance with present principles.

Now in reference to FIG. 10, it shows an example of an input device 1000 such as e.g. a touch-enabled display or touch-enabled pad which may be on a device such as the system 100. It is to be understood that the tracing indicating the number fifty six as shown in FIG. 10 represents one or more paths and/or areas of the device 1000 to which input was directed by a user e.g. using a pen and/or finger. Furthermore, note that a representation of this input may be presented on a display of a device, similar to as was described above in reference to FIGS. 4-6, mutatis mutandis.

Further describing FIG. 10, it is to be understood that two areas may be defined and/or identified by the device based on the input to the input device 1000. A first area represented in FIG. 10 by the box 1002 is an area established based on the total height and total width of the input. However, as may be appreciated from FIG. 10, a portion 1004 extends away from another area of the input device 1000 represented by box 1006 to which a majority of the input has been directed. It may thus be appreciated that FIG. 10 represents an instance where a relatively long single and/or errant stroke of input represented by the portion 1004 has been provided to the input device, and in such an instance should that area as represented by the box 1002 be used to determine a contour width in accordance with present principles, use of that area may skew representation of the input to having an undesirable contour width (e.g., too wide). Thus, present principles recognize that in such an instance, e.g., the length of the relatively long single stroke width may be disregarded (in this case, the portion 1004).

Accordingly, in one embodiment, this may be done by e.g. determining and/or identifying the locations on the input device 1000 to which the input was directed (e.g. called "stroke points" below) as represented in the present instance by the tracing shown, and then determining a weight and/or gravity of those stroke points (e.g. the "gravity" of where most of those points are located) to thus identify an area to use for determining contour width. E.g., based on the stroke points, a device such as the system 100 may determine an area in which the majority of the points are located (e.g. a threshold number of stroke points and/or a threshold percentage of total stroke points for a given input). In the present instance shown in FIG. 10, this concentrated region of stroke points is represented by the box 1006.

Thus, e.g., in an instance where ninety percent of the stroke points are to one region of an input device, but one or more errant strokes are outside that region, the gravity and/or weight determination and use as set forth herein allows the device to determine and/or use a more "focused" area for determining a contour width at which a representation of the input should be presented.

Without reference to any particular figure, it is to be understood that although different scale factors may be used based on whether input to an input device was from a pen or a person's body, different scale factors may be used based on which input device input was provided to. Thus, e.g., different scale factors may be used based on pen input to a touch-enabled display of a convertible computer and based on pen input to a touch-enabled pad of the convertible computer.

Furthermore, scale factors may vary depending on the physical configuration of the device itself, such as e.g. using one scale factor when the convertible computer is in a laptop configuration and using a different scale factor when the convertible computer is in a tablet configuration. Thus, any combination of input methods (e.g. pen or finger), input devices, and/or device configurations may result in a different scale factor being used than a different combination.

Also without reference to any particular figure, it is to be understood that in addition to e.g. input height, width, and/or area being used to determine a contour width in accordance with present principles, width of contours of the input to the input device may instead or additionally be used to determine a contour width.

It may now be appreciated that present principles provide for automatically adjusting handwriting and/or pen stroke width as presented on a display based on the (e.g. overall) character size of the input itself. Present principles may be undertaken by a device executing an application for performing the actions disclosed herein, such as e.g. a handwriting input editor, a note taking application, a word processing application, etc. In any case, present principles provide devices, systems, and methods to automatically adjust a stroke width at which a representation of input is presented based on the character size of the actual input. Determining such a stroke width may be done by multiplying a scale factor by character size.

In some embodiments, the device may start with a default stroke width, and then after detecting enough characters to make decision (e.g. a threshold amount), all the existing and future stroke width may be adjusted to reflect a new stroke width determined based on at least the threshold amount. Also in some embodiments, the stroke width may be changed based on the mean and/or variance value of character size distributions. Still further, in some embodiments a scale factor may be tuned and/or set by a user, and/or determined by the device using learning and/or prediction methods and/or applications. Also, in some embodiments, when a user provides input (e.g. writes) at different scales, the stroke width for each differing portion of the input may also be scaled automatically and accordingly.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave or a signal per se.

While the particular PRESENTATION OF REPRESENTATIONS OF INPUT WITH CONTOURS HAVING A WIDTH BASED ON THE SIZE OF THE INPUT is herein shown and described in detail, it is to be understood that the subject matter which is encompassed by the present application is limited only by the claims.

What is claimed is:

1. A device, comprising:
   at least one processor;
   a touch-enabled display accessible to the at least one processor; and
   storage accessible to the at least one processor and bearing instructions executable by the at least one processor to:
   receive first input to the touch-enabled display;
   identify a first scale factor, wherein the first scale factor is identified based at least in part on a setting that, while configured, enables plural future identifications of scale factors based on the respective sizes of respective inputs received at the touch-enabled display, wherein the setting is configured based at least in part on second input received a single time at a graphical object presented on a first graphical user interface (GUI) such that based on the second input being received the single time the setting is configured for the device to subsequently perform the plural future identifications, the graphical object associated with using the respective sizes of the respective inputs to the touch-enabled display to identify scale factors; and
   present a representation of the first input on the touch-enabled display, the representation being presented with the width of one or more contours of the representation being based on the first scale factor and the size of at least a portion of the first input to the touch-enabled display, wherein the representation is presented on the touch-enabled display via a second GUI different from the first GUI.

2. The device of claim 1, wherein the width of the one or more contours of the representation is based on the first scale factor as well as the height and/or the width of the first input to the touch-enabled display.

3. The device of claim 1, wherein the representation is presented with the width of one or more contours of the representation being correlated to the size of a first portion of the first input to the touch-enabled display but not being correlated based on a second portion of the same first input to the touch-enabled display.

4. The device of claim 1, wherein the width of one or more contours of the representation is also based on at least one pressure at which the first input was applied to the touch-enabled display.

5. The device of claim 1, wherein a touch-enabled pad is disposed on the device, the touch-enabled pad being different from the touch-enabled display, wherein the first scale factor is identified based at least in part on the first input being received at the touch-enabled display, and wherein a second scale factor is identified based at least in part on the first input being received at touch-enabled pad.

6. The device of claim 1, wherein the first scale factor is also identified based on identification of the first input as being received at the touch-enabled display based on contact with the touch-enabled display via one of a pen and a body part such that a second scale factor is identified based on identification of the first input as being received at the touch-enabled display based on contact with the other of a pen and a body part, the first scale factor being different from the second scale factor.

7. The device of claim 1, wherein the first GUI is a settings GUI that also indicates other settings related to presentation of representations of the respective inputs, the other settings also being configurable based on selection of other respective graphical objects presented on the first GUI.

8. The device of claim 1, wherein the first scale factor is identified based at least in part on identification of a first physical configuration of the device, and wherein the first physical configuration is established by conversion of the device from one of a laptop configuration and a tablet configuration to the other of the laptop configuration and the tablet configuration, the laptop configuration being different from the tablet configuration.

9. The device of claim 8, wherein the first physical configuration is the laptop configuration, and wherein the instructions are executable to:
identify the first scale factor based on identification of the device being in the laptop configuration;
identify a second scale factor different from the first scale factor based on identification of the device being in the tablet configuration; and
present the representation of the first input on the touch-enabled display, the representation being presented with the width of one or more contours of the representation being based on the first scale factor while the device is in the laptop configuration and with the width of one or more contours of the representation being based on the second scale factor while the device is in the tablet configuration.

10. A method, comprising:
receiving first input to a touch-enabled display accessible to a device;
identifying a first scale factor, wherein the first scale factor is identified based at least in part on a setting that, while configured, enables plural future identifications of scale factors based on the respective sizes of respective inputs received at the touch-enabled display, and wherein the setting is configured based at least in part on second input received a single time at a graphical object presented on a first graphical user interface (GUI) such that based on the second input being received the single time the setting is configured for the device to subsequently perform the plural future identifications, the graphical object associated with using the respective sizes of the respective inputs to the touch-enabled display to identify scale factors; and
presenting a representation of the first input on the touch-enabled display via a second GUI presented on the touch-enabled display, the second GUI being different from the first GUI, the representation being presented with the width of one or more contours of the representation being based at least partially on the first scale factor and the size of at least a portion of the first input to the touch-enabled display.

11. The method of claim 10, wherein a touch-enabled pad is accessible to the device, the touch-enabled pad being different from the touch-enabled display, wherein the first scale factor is identified based at least in part on the first input being received at the touch-enabled display, and wherein a second scale factor is identified based at least in part on the first input being received at touch-enabled pad.

12. The method of claim 10, wherein the setting is a first setting, wherein the graphical object is a first graphical object, and wherein the first GUI comprises a second graphical object that is selectable to configure a second setting for the device to present representations of the respective inputs with the width of one or more contours of respective representations being based on the height of the respective inputs, the first GUI also comprising a third graphical object that is selectable to configure a third setting for the device to present representations of the respective inputs with the width of one or more contours of the respective representations being based on the widths of the respective inputs.

13. The method of claim 10, wherein the first scale factor is identified based at least in part on identification of a first physical configuration of the device, and wherein the first physical configuration is established by conversion of the device from one of a laptop configuration and a tablet configuration to the other of the laptop configuration and the tablet configuration, the laptop configuration being different from the tablet configuration.

14. The method of claim 13, wherein the first physical configuration is the laptop configuration, and wherein the method comprises:
identifying the first scale factor based on identification of the device being in the laptop configuration;
identifying a second scale factor different from the first scale factor based on identification of the device being in the tablet configuration, and
presenting the representation of the first input on the touch-enabled display via the second GUI, the representation being presented with the width of one or more contours of the representation being based on the first scale factor while the device is in the laptop configuration and with the width of one or more contours of the representation being based on the second scale factor while the device is in the tablet configuration.

15. A computer readable storage medium (CRSM) that is not a transitory signal, the CRSM comprising instructions executable by at least one processor of a device to:

receive first input to a touch-enabled display accessible to the device;

identify a first scale factor, wherein the first scale factor is identified based at least in part on a setting that, while configured, enables plural future identifications of scale factors based on the respective sizes of respective inputs received at the touch-enabled display, and wherein the setting is configured based at least in part on second input received a single time at a graphical object presented on a first graphical user interface (GUI) such that based on the second input being received the single time the setting is configured for the device to subsequently perform the plural future identifications, the graphical object associated with using the respective sizes of the respective inputs to the touch-enabled display to identify scale; and present a representation of the first input on the touch-enabled display via a second GUI presented on the touch-enabled display, the second GUI being different from the first GUI, the representation being presented with the width of one or more contours of the representation being based on the first scale factor.

16. The CRSM of claim 15, wherein a touch-enabled pad is accessible to the at least one processor and is different from the touch-enabled display, wherein the first scale factor is identified based at least in part on the first input being received at the touch-enabled display, and wherein a second scale factor is identified based at least in part on the first input being received at touch-enabled pad.

17. The CRSM of claim 15, wherein the setting is a first setting, wherein the graphical object is a first graphical object, and wherein the first GUI comprises a second graphical object that is selectable to configure a second setting for the device to present representations of the respective inputs with the width of one or more contours of respective representations being based on the height of the respective inputs, the first GUI also comprising a third graphical object that is selectable to configure a third setting for the device to present representations of the respective inputs with the width of one or more contours of the respective representations being based on the widths of the respective inputs.

18. The CRSM of claim 15, wherein the instructions are executable by the at least one processor to:

identify the first scale factor based at least in part on a first physical configuration of the device as established by conversion of the device from one of a laptop configuration and a tablet configuration to the other of the laptop configuration and the tablet configuration, the laptop configuration being different from the tablet configuration.

19. The CRSM of claim 18, wherein the first physical configuration is the laptop configuration, and wherein the instructions are executable to:

identify the first scale factor based on the device being in the laptop configuration;

identify a second scale factor different from the first scale factor based on the device being in the tablet configuration; and present the representation of the first input on the touch-enabled display via the second GUI, the representation being presented with the width of one or more contours of the representation being based on the first scale factor while the device is in the laptop configuration and with the width of one or more contours of the representation being based on the second scale factor while the device is in the tablet configuration.

* * * * *